(12) United States Patent
Lebaudy et al.

(10) Patent No.: US 6,808,202 B2
(45) Date of Patent: *Oct. 26, 2004

(54) HYBRID GAS GENERATOR UNIT FOR INFLATING AN AIRBAG USED IN MOTOR VEHICLE SAFETY

(75) Inventors: Franck Lebaudy, Loperhet (FR); François Peremarty, Quimper (FR); Christian Perotto, Ergue-Gaberic (FR)

(73) Assignee: Livbag SNC, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/247,361

(22) Filed: Sep. 20, 2002

(65) Prior Publication Data

US 2003/0075909 A1 Apr. 24, 2003

(30) Foreign Application Priority Data

Oct. 19, 2001 (FR) .............................................. 01 13489

(51) Int. Cl.⁷ .............................................. B60R 21/26
(52) U.S. Cl. ..................................................... 280/736
(58) Field of Search ................................. 280/736, 740, 280/741, 743.1, 730.2

(56) References Cited

U.S. PATENT DOCUMENTS

| | | |
|---|---|---|
| 5,593,180 A | 1/1997 | Cuevas et al. |
| 5,967,550 A | 10/1999 | Shirk et al. |
| 6,145,876 A | 11/2000 | Hamilton |
| 6,170,867 B1 * | 1/2001 | Rink et al. ................... 280/736 |
| 6,460,873 B1 | 10/2002 | Lebaudy et al. |
| 2003/0075904 A1 | 4/2003 | Lebaudy et al. |

FOREIGN PATENT DOCUMENTS

WO  WO 01/34516 A2  5/2001

* cited by examiner

Primary Examiner—Faye M. Fleming
(74) Attorney, Agent, or Firm—Oliff & Berridge, PLC

(57) ABSTRACT

A hybrid gas generator unit (1) may be used to inflate at least one side airbag. The hybrid gas generator contains a pyrotechnic gas generator (2) produced using a body (5), which contains an igniter (5) and which is provided with first and second ends (6, 7), and a flexible element (8), which contains a pyrotechnic charge (10) and which is attached to the second end of the body; and a pressurized gas (4) reservoir (3) attached to the pyrotechnic gas generator at the first end of the body. In the hybrid gas generator, the igniter is capable during operation of initiating the combustion of the pyrotechnic charge contained in the flexible element and of causing the pressurized gas contained in the reservoir to be released.

10 Claims, 2 Drawing Sheets

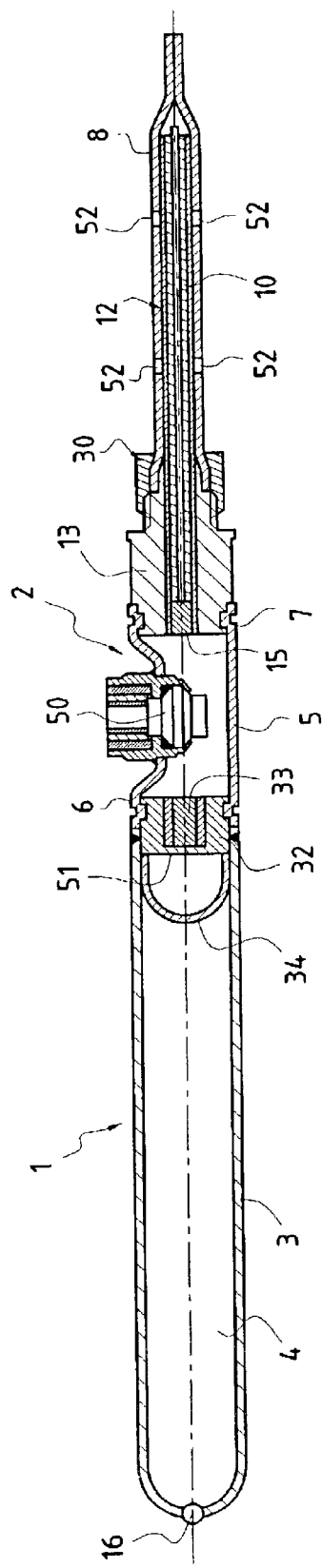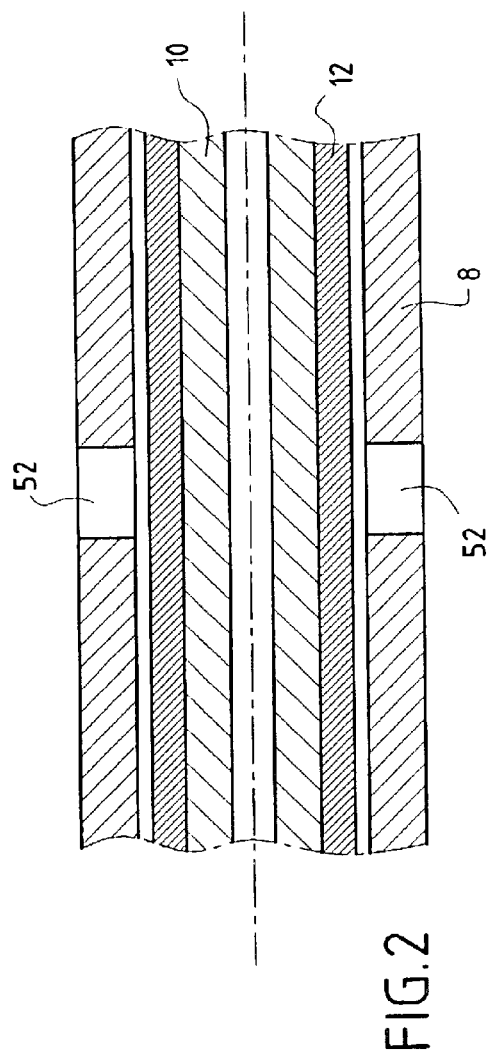
FIG.1
FIG.2

HYBRID GAS GENERATOR UNIT FOR INFLATING AN AIRBAG USED IN MOTOR VEHICLE SAFETY

The present invention relates to the field of motor vehicle safety and concerns, on the one hand, a hybrid gas generator unit and, on the other hand, a pyrotechnic gas generator for inflating a side airbag.

In recent years, new generators called adaptive generators have appeared, for limiting the risk of body injuries brought about by deployment of the airbag. To do this, these various generators, coupled to suitable detection systems, allow the flow rate and/or the volume of gas to be modulated according to certain parameters such as, for example, the morphology and the position of the passenger, the ambient temperature, and the nature and intensity of the impact. These generators are in all cases designed to operate within a time period of about fifty milliseconds.

Very recently, motor vehicle manufacturers wanted to incorporate devices using inflatable airbags to protect occupants, not only when the vehicle suffers a side impact, but also when the vehicle rolls over after a side impact. To do this, the airbags must remain inflated for some ten seconds. U.S. Pat. No. 5,967,550 discloses a generator provided with two pyrotechnic charges, the first serving to inflate the airbag within milliseconds after the accident and the second keeping the airbag inflated for some ten seconds. However, owing to the particular geometry of this generator, the latter cannot be easily integrated into all motor vehicles.

A device has therefore been proposed, as in patent application WO 01/34516, which comprises, on the one hand, a main body containing an electropyrotechnic igniter and a first pyrotechnic charge and, on the other hand, a tube attached to the main body and containing a second pyrotechnic charge consisting of powder particles. This device has the advantage, over the abovementioned generator, of possessing a compact main body coupled to a tube that can easily be housed along the vehicle's roof. However, because of the use of two separate pyrotechnic charges, the cost of manufacturing such a device is relatively high, this being prejudicial in a competitive market such as that of the motor vehicle industry. In addition, the use of a pyrotechnic charge in the form of powder particles in the tube is detrimental since, in operation, very hot particles are in the airbag and these can cause premature degradation of the latter. Moreover, the use of a pyrotechnic charge to generate gas during a period of some ten seconds has the effect that the surface of the device is maintained at a temperature of about several hundred degrees Celsius over this time period. This may be damage for the airbag or the vehicle furnishings near the device.

A person skilled in the art is therefore always looking for a device for alleviating the abovementioned problems.

The subject of the present invention relates to a hybrid gas generator unit used for motor vehicle safety to inflate at least one side airbag, characterized in that it comprises:
- a pyrotechnic gas generator produced using, on the one hand, a body which contains an electropyrotechnic igniter and which is provided with first and second ends and, on the other hand, a flexible element which contains a pyrotechnic charge and which is attached to the second end of the body;
- a pressurized gas reservoir attached to the pyrotechnic gas generator at the first end of the body;
- the said igniter being capable during operation, on the one hand, of initiating the combustion of the pyrotechnic charge contained in the flexible element and, on the other hand, of causing the pressurized gas contained in the reservoir to be released.

This generator unit, apart from the fact that it possesses a geometry allowing it to be integrated into all kinds of motor vehicles, therefore has a greatly reduced manufacturing cost owing to the use of a pressurized gas reservoir instead of a pyrotechnic charge.

Preferably, the pyrotechnic charge contained in the flexible element is capable of generating a volume of gas sufficient to fully inflate the airbag in a time period of less than forty milliseconds. Moreover, in operation, the pressurized gas contained in the reservoir is released so as to keep the airbag inflated for a time period of the order of several seconds. This pressurized gas is uniformly released only from the moment when the airbag has been fully inflated after the combustion of the pyrotechnic charge.

Advantageously, the pyrotechnic charge contained in the flexible element is produced in the form of a cylindrical block which, on the one hand, has a length very much greater than its diameter and, on the other hand, is provided with a central channel. Again, advantageously, this pyrotechnic charge consists of a composite propellant comprising a charge based on ammonium perchlorate, sodium nitrate and an inert binder.

Preferably, a heat-shrunk pliant sleeve grips and confines the pyrotechnic charge contained in the flexible element. Advantageously, the electropyrotechnic igniter initiates, on the one hand, the combustion of the pyrotechnic charge contained in the flexible element and causes, on the other hand, the pressurized gas contained in the reservoir to be released by means of booster charges.

Again, advantageously, the flexible element is produced using a pliant tube made of a thermoplastic, provided with outlet orifices uniformly distributed over its circumference and along its length. Since the pyrotechnic charge is housed in the tube, all that is therefore required is to adapt the length of this tube to the size of the airbag used. In addition, the choice of such a material to form the tube makes the generator unit safer since, in the event of abnormal pressurization, any spraying of metal parts liable to injure an occupant is prevented.

The present invention also relates to a pyrotechnic gas generator used in motor vehicle safety to inflate a side airbag, characterized in that it comprises:
- a flexible element containing a pyrotechnic charge produced in the form of a cylindrical block provided with a central channel, the said block preferably having a length that is much greater than its diameter;
- an electropyrotechnic igniter located near the pyrotechnic charge.

Preferably, a heat-shrunk pliant sleeve grips and confines the pyrotechnic charge. In addition, the flexible element may be produced using a pliant tube made of a thermoplastic, provided with outlet orifices uniformly distributed over its circumference and along its length.

FIG. 1 is a longitudinal sectional view of a hybrid gas generator unit according to the invention.

FIG. 2 is an enlarged partial view of the flexible tube containing the pyrotechnic charge gripped in the pliant sleeve.

Figure 3:
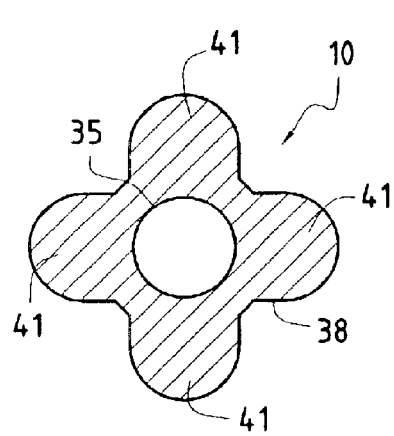
FIG. 3 is a cross-sectional view of a first pyrotechnic charge that can be housed in the flexible element.

FIGS. 1 and 2 show a hybrid gas generator unit 1 according to the invention, produced using a pyrotechnic gas generator 2 to which a reservoir 3 of pressurized gas 4 is directly attached.

The pyrotechnic generator 2 consists of a body 5 having a first end 6 and a second end 7, of an electropyrotechnic igniter 50 and of a pliant tube 8 made of a thermoplastic in which a pyrotechnic charge is housed. More specifically, this body is provided with a central orifice into which the electropyrotechnic igniter 50 is inserted and then welded. The pyrotechnic charge is produced in the form of a cylindrical block 10 to which a booster charge 15 is coupled, a heat-shrunk pliant sleeve 12 gripping the whole assembly. A ring 13 having a conical nose is fastened by crimping into the body 5 at its second end 7. A first end of the pyrotechnic charge thus confined is inserted into the ring 13. The tube 8 has, on one side, a first end which is fitted onto the conical nose of the ring 13, attached to which first end is a collar 30 fastened by screwing into the said ring 13, and, on the other side, a second end which is swaged and which, after welding, allows a sealed plug to be formed. In addition, the tube 8 has gas outlet orifices 52 which are uniformly distributed over its circumference and along its length.

A cylindrical metal piece 32 having a central recess is fastened by crimping into the body 5 at its first end 6 and a booster charge 33 is housed in the central recess. This central recess is hollowed out over practically the entire length of the metal piece 32 so as to leave only a thin solid end 51 that can act, in operation, as a frangible membrane. The reservoir 3 is produced from a cylindrical metal body having, on one side, a first end having an orifice for filling it with gas 4, the said orifice being closed off by a plug 16 fastened by welding, and, on the other side, an open second end. A cylindrical metal body 34 provided with a central passage forming an internal nozzle is introduced into the reservoir 3 and is press-fitted into it near the second end of the said reservoir 3. The reservoir 3 provided with the metal body 34 is finally fastened by welding to the pyrotechnic generator 2 at the metal piece 32.

Figure 4:
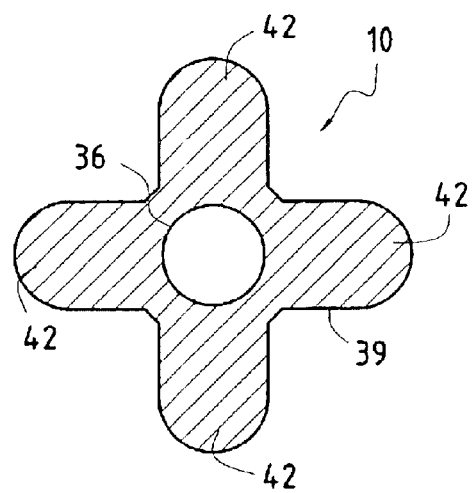
FIG. 4 is a cross-sectional view of a second pyrotechnic charge that can be housed in the flexible element.
Figure 5:
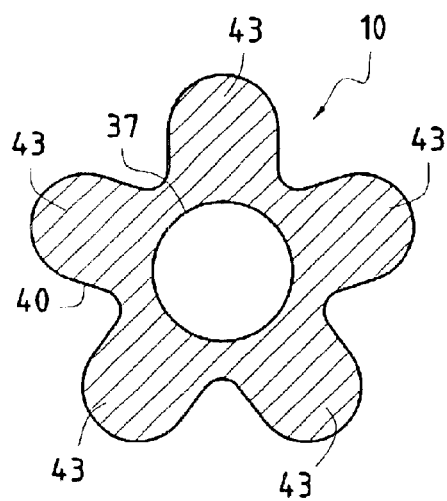
FIG. 5 is a cross-sectional view of a third pyrotechnic charge that can be housed in the flexible element.
Figure 6:
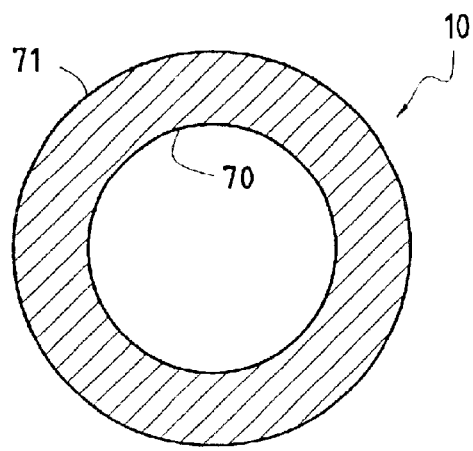
FIG. 6 is a cross-sectional view of another pyrotechnic charge that can be housed in the flexible element.

FIGS. 3 to 5 show three examples of a pyrotechnic charge that can form the block 10. In these three cases, the block 10 possesses, on the one hand, a central channel 35, 36, 37 having a diameter of between 0.9 and 1.5 millimetres and, on the other hand, a side wall 38, 39, 40 provided over its entire length with protuberances 41, 42, 43. FIG. 6 shows that the block 10 may also be produced in the form of a tube possessing a side wall 71 and a central channel 70. In all cases, the block 10 advantageously consists of a composite propellant comprising a charge based on ammonium perchlorate and sodium nitrate, and an inert binder.

In the event of an impact requiring the airbag to inflate in order to protect the occupant, the generator unit 1 operates in the following manner. The electropyrotechnic igniter 50 ignites the two booster charges 15 and 33. The booster charge 15 very rapidly initiates the combustion of the block 10, which within a few milliseconds generates a large amount of gas that can escape via the outlet orifices 52. Finally, the airbag is fully inflated within a time period not exceeding forty milliseconds.

After the block 10 has stopped burning, the booster charge 33 forces the solid end 51 of the metal piece 32 to rupture and the pressurized gas 4 contained in the reservoir 3 can slowly escape, passing firstly through the central passage of the metal body 34, then the metal piece 32 and the body 5, and finally penetrates the now empty tube 8. This gas 4 then escapes via the outlet orifices 52 and keeps the airbag fully inflated for a time period of some ten seconds. It is possible to increase or reduce this time period by varying the pressure level and the volume of the gas 4 in the reservoir 3 or else by modifying the diameter of the central passage of the metal body 34.

What is claimed is:

1. Hybrid gas generator unit used for motor vehicle safety to inflate at least one side airbag, said generator unit comprising:

a pyrotechnic gas generator produced using a body which contains an electropyrotechnic igniter and which is provided with first and second ends and a flexible element which contains a pyrotechnic charge and which is attached to the second end of the body;

a pressurized gas reservoir attached to the pyrotechnic gas generator at the first end of the body;

said igniter being capable during operation of initiating the combustion of the pyrotechnic charge contained in the flexible element and of causing the pressurized gas contained in the reservoir to be released.

2. Generator unit according to claim 1, characterized in that the pyrotechnic charge contained in the flexible element is capable of generating a volume of gas sufficient to inflate the airbag in a time period of less than forty milliseconds.

3. Generator unit according to claim 1, characterized in that, in operation, the pressurized gas contained in the reservoir is released so as to keep the airbag inflated for a time period of about several seconds.

4. Generator unit according to claim 1, characterized in that the pyrotechnic charge contained in the flexible element is produced in the form of a cylindrical block provided with a central channel.

5. Generator unit according to claim 1, characterized in that the pyrotechnic charge contained in the flexible element comprises a composite propellant comprising a charge based on ammonium perchlorate, sodium nitrate and an inert binder.

6. Generator unit according to claim 1, characterized in that a heat-shrunk pliant sleeve grips and confines the pyrotechnic charge contained in the flexible element.

7. Generator unit according to claim 1, characterized in that the igniter initiates the combustion of the pyrotechnic charge contained in the flexible element and causes the pressurized gas contained in the reservoir to be released by means of booster charges.

8. Generator unit according to claim 1, characterized in that the flexible element is produced using a pliant tube made of a thermoplastic, provided with outlet orifices uniformly distributed over its circumference and along its length.

9. Pyrotechnic gas generator used in motor vehicle safety to inflate a side airbag, said generator comprising:

a flexible element containing a pyrotechnic charge produced in the form of a cylindrical block provided with a central channel; and an electropyrotechnic igniter located near the pyrotechnic charge, wherein a heat-shrunk pliant sleeve grips and confines the pyrotechnic charge.

10. Pyrotechnic generator according to claim 9, characterized in that the flexible element is produced using a pliant tube made of a thermoplastic, provided with outlet orifices uniformly distributed over its circumference and along its length.

* * * * *